(12) United States Patent
McKim et al.

(10) Patent No.: US 10,753,506 B2
(45) Date of Patent: Aug. 25, 2020

(54) VALVE LOCKOUT SYSTEM

(71) Applicant: GJR Meyer Service, Inc., Corpus Christi, TX (US)

(72) Inventors: Noel McKim, Corpus Christi, TX (US); Randy Scott Meyer, Alice, TX (US)

(73) Assignee: GJR Meyer Service, Inc., Corpus Christi, TX (US)

( * ) Notice: Subject to any disclaimer, the term of this patent is extended or adjusted under 35 U.S.C. 154(b) by 0 days.

(21) Appl. No.: 16/010,492

(22) Filed: Jun. 17, 2018

(65) Prior Publication Data

US 2019/0383421 A1    Dec. 19, 2019

(51) Int. Cl.
*F16K 35/00*    (2006.01)
*F16K 35/08*    (2006.01)

(52) U.S. Cl.
CPC ............. *F16K 35/08* (2013.01); *F16K 35/00* (2013.01)

(58) Field of Classification Search
CPC ...... F16K 31/124; F16K 31/42; F16K 31/423; F16K 31/426; F16K 35/00; F16K 35/08
USPC ..................... 251/30.01, 30.02, 94
See application file for complete search history.

(56) References Cited

U.S. PATENT DOCUMENTS

| | | | |
|---|---|---|---|
| 3,367,355 A * | 2/1968 | Anderson ............. | B63B 22/023 137/209 |
| 3,670,836 A * | 6/1972 | Tonkowich ........... | B60R 25/042 180/287 |
| 3,788,341 A * | 1/1974 | Athy, Jr. ............... | F16K 31/124 137/209 |
| 3,907,248 A * | 9/1975 | Coulbeck ............. | F16K 31/122 251/30.02 |
| 5,163,479 A * | 11/1992 | Keeney ................. | F17C 13/025 137/871 |
| 5,884,894 A * | 3/1999 | Smith ....................... | F15B 9/09 137/625.64 |

(Continued)

*Primary Examiner* — Kevin F Murphy
(74) *Attorney, Agent, or Firm* — The Kubiak Law Firm PLLC

(57) ABSTRACT

A restricted access lockout system restricts access to remotely operated hydraulically actuated valves by utilizing a processor to compare each user's access code against a stored list. The user access code may be provided by card key with an embedded RFID chip, a designated application on a personal device such as a smart phone or smart pad that may communicate with the processor via Bluetooth, Wi-Fi, Internet, or radio. Once the processor grants access to operate various designated hydraulically actuated valves the designated hydraulically actuated valves are unlocked for designated period of time. After the designated period of time expires the hydraulically actuated valves are relocked. Generally, the lock is via a hydraulic cylinder where the hydraulic fluid may be isolated through one or more solenoid control valves. Hydraulic fluid within the hydraulic cylinder and the cylinder provide a sufficient counter to apply force so that the hydraulically actuated valves may not be manipulated. In certain instances, the hydraulic locks may be replaced by mechanical lock. In other instances, the hydraulic cylinders may be supplied with pressurized hydraulic fluid supply by hydraulic pump wherein the pump is actuated by the processor upon command by a user. The pressurized hydraulic fluid and the hydraulic cylinders may in turn allow the user to remotely actuate the hydraulically actuated valves.

5 Claims, 4 Drawing Sheets

(56) References Cited

U.S. PATENT DOCUMENTS

| | | | | |
|---|---|---|---|---|
| 6,772,718 B2* | 8/2004 | Allen | ............ | F01L 9/02 |
| | | | | 123/90.12 |
| 6,966,285 B1* | 11/2005 | Sun | ............ | F01L 9/02 |
| | | | | 123/90.11 |
| 7,690,393 B2* | 4/2010 | Nagle | ............ | E03B 7/08 |
| | | | | 137/357 |
| 8,290,631 B2* | 10/2012 | Sweeney | ............ | G01D 3/036 |
| | | | | 700/282 |

* cited by examiner

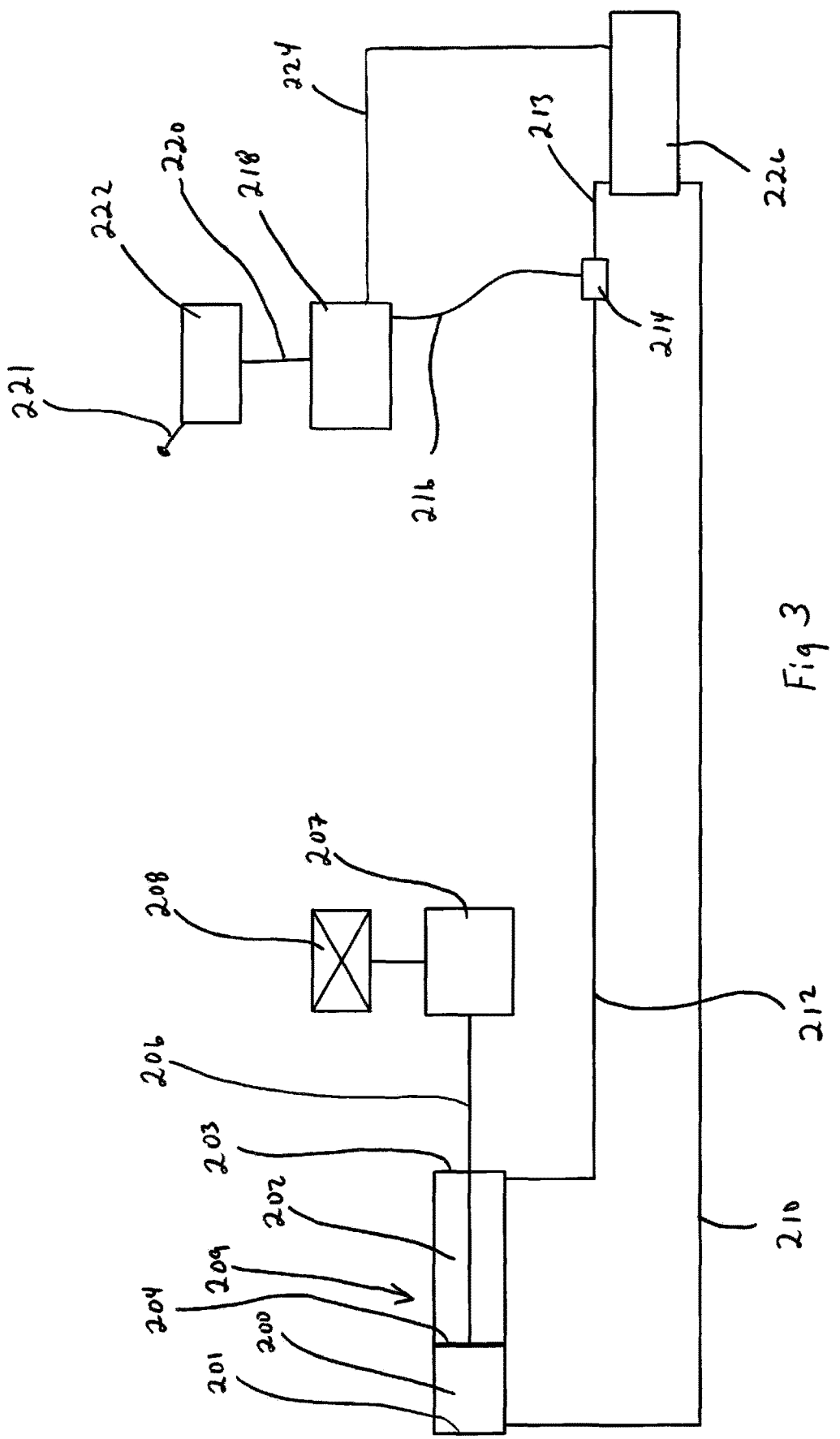

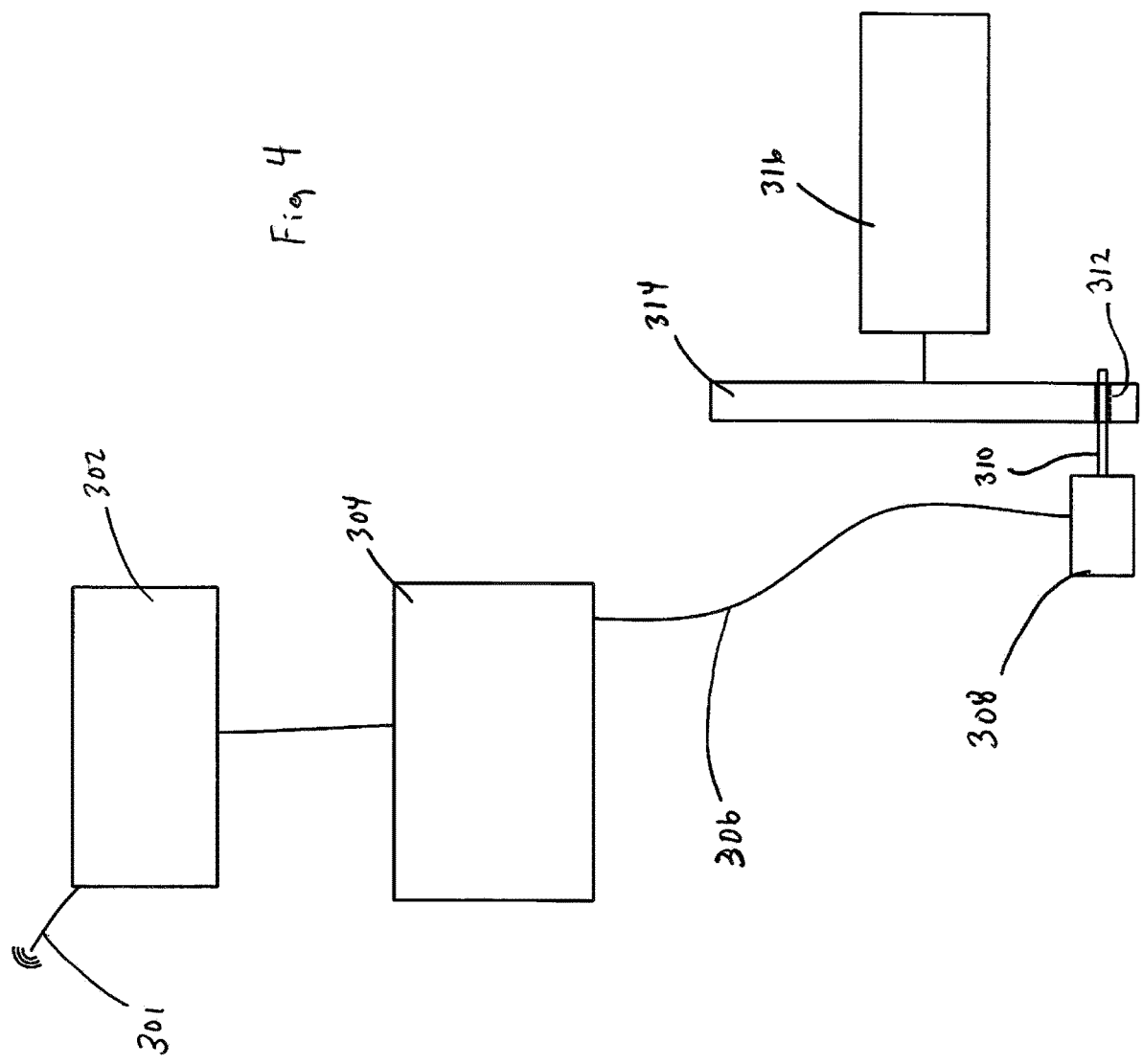

VALVE LOCKOUT SYSTEM

BACKGROUND

Many industries utilize remotely actuated hydraulic valves. Such valves may be required due to system complexity where multiple valves located in hard to access or widely varied locations are actuated in relatively quick succession. In other instances, the valves may be located in hazardous locations. For instance, a wellsite suffused with potentially explosive hydrocarbons where the systems are being operated under high pressure. In other instances, or in combination with the requirements listed above valves requiring a high degree of force to actuate may be used.

In such instances a hydraulic circuit is used to control each hydraulically actuated valve, where each of the hydraulic circuits may be routed through a single location. In such instances the single location usually provides the hydraulic power to actuate each hydraulically actuated valve as well as the hydraulic control circuit to either open or close a particular valve. In some instances, unauthorized personnel may utilize the single location controls to open or close a hydraulically actuated valve. Opening or closing a hydraulically actuated valve at an inopportune time may cause significant damage to the hydraulically actuated valve, to the wellsite, or other equipment that may be utilizing the hydraulically actuated valve.

SUMMARY

In order to prevent unauthorized personnel from utilizing the single location controls to open or close a hydraulically actuated valve it has been found beneficial to include a valve lockout. In an embodiment of the present invention a bi-stable hydraulic actuator is attached to each valve controller where the valve controller actuates the circuit to either open or close a hydraulically actuated valve. In particular the hydraulically operated valve is part of a frac stack controlling the flow of fracturing fluids into a wellbore. A bi-stable hydraulic actuator has at least two positions where the actuator will remain without power applied to the system.

Generally, when the lockout system is actuated valves in a hydraulic circuit open to allow hydraulic fluid to flow out of one side of the bi-stable actuator and into the other side of the hi-stable actuator as external mechanical forces are applied to bi-stable actuator. In practice, once the lockout system is actuated the control system handle is free to move when the valves that control flow of hydraulic fluid into or out of the hi-stable actuators are open. Therefore, as the control system handle moves from a first position to a second position a ram attached to the hi-stable actuator is also moved from a first position to a second position. The piston attached to the ram within the bi-stable actuator moves from one side to the other forcing fluid out of one side of the bi-stable actuator and drawing fluid into the other side of the bi-stable actuator. When the lockout system is deactivated the valve or valves allowing hydraulic fluid into and out of the hi-stable actuator close. With the valves closed, the piston within the hi-stable actuators is no longer able to move within the hi-stable actuator as the hydraulic fluid is incompressible fluid. With the piston locked the ram is locked which in turn locks the control system handle in place.

In addition to the above features it is beneficial to restrict access to the lockout system so that unauthorized persons do not have unrestricted access to the valve controls. Therefore, it is contemplated that the valves that control the flow of hydraulic fluid into or out of the hi-stable actuators are controlled through a processor. In one embodiment the valves that control the flow of hydraulic fluid into or out of the hi-stable actuators are controlled by solenoids, where each solenoid controls a valve to allow fluid to flow in the hydraulic circuit utilized by the hi-stable actuators. In practice the processor is generally located near the solenoids and receives a command to allow the flow of hydraulic fluid into or out of the hi-stable actuators. The processor then activates the appropriate circuitry whether electric or pneumatic to allow cause the solenoids to open the associated valve in order to allow the flow of hydraulic fluid into or out of the hi-stable actuators.

Typically, the command to the processor to allow the flow of hydraulic fluid into or out of the bi-stable actuators is a simple string of symbols or numbers that may be checked against a stored list of symbols or numbers. If the command string of symbols or numbers matches the stored list access is granted. The command string of symbols or numbers may be input locally by use of a keypad, a key fob, a card key, or similar device. Generally, the local input is preferably very short range, preferably limited to within five feet of the input device in order to prevent the possibility that an authorized user is within range of the local input while an unauthorized person is at the controls. It is contemplated that in some instances remote input may be preferred or may be used in addition to local input. In such instances it is contemplated that the processor may be accessed via an Internet connection to the Internet connection may be hardwired, via mobile phone, radio, or other Internet capable connection. In some instances, remote access may be gained through other means than an Internet connection. For instance, the remote access may be via a hardwired or radio link to a truck such as the pressure pumping van.

While the lockout system is contemplated to prevent access by unauthorized individuals it may be desirable in certain circumstances, such as an emergency, to allow access to the lockout system to open or close various valves as required. In such circumstances it is contemplated that an emergency access code will be printed or otherwise provided for one-time access to the valves through the lockout system. In such instances where the emergency code is utilized access may be granted for a period of time long enough to correct an emergency. Additionally, when emergency access is granted the processer will activate an alarm. The alarm may be flashing lights, a siren or other audible alarm, a text or other message sent to the operator, or any combination. Further, mechanical access to manipulate the valves may be provided to allow for an emergency override of the lockout system.

BRIEF DESCRIPTION OF THE DRAWINGS

FIG. 3 depicts a lockout system incorporating a hydraulic motor.

FIG. 4 depicts a lockout system incorporating a mechanical lock.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
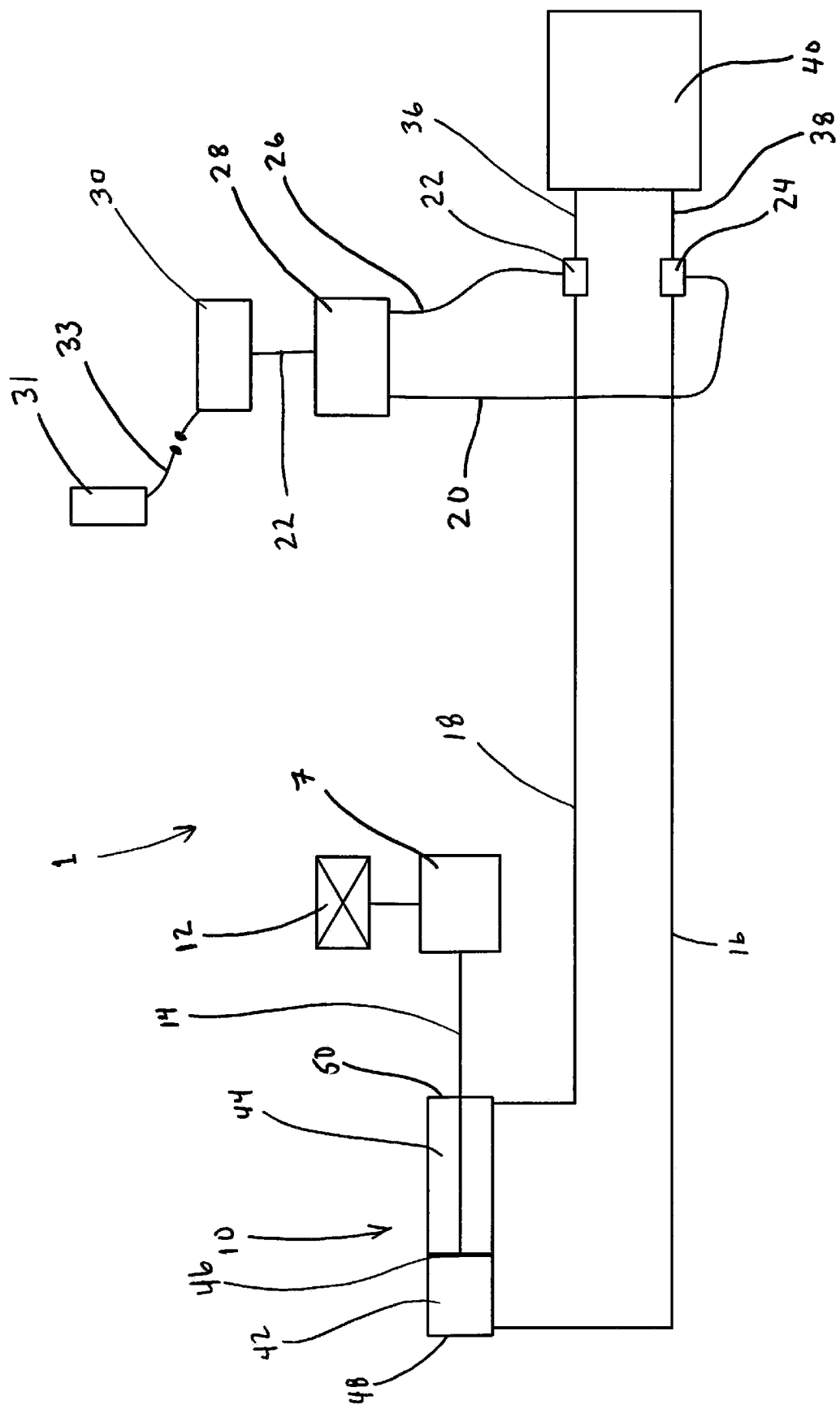
FIG. 1 depicts an embodiment of the present invention having a single lockout.

FIG. 1 depicts an embodiment of the present invention having a single lockout. Additional lockouts may be added to a system as necessary. In one embodiment four lockouts are used in the system. In particular the lockout system 1 includes a bi-stable hydraulic actuator 10 where hydraulic pressure within the bi-stable hydraulic actuator 10 provides a counterforce to any attempted actuation of a hydraulically actuated valve 12 or the handle 7 attached thereto. The counterforce provided by the bi-stable hydraulic actuator 10 essentially locks the connected hydraulically actuated valve 12 in place until such time as hydraulic pressure within the bi-stable actual hydraulic actuator 10 is released. The bi-stable hydraulic actuator 10 includes ram 14 attached to valve 12 through handle 7. In practice it is envisioned that ram 14 may be attached to either handle 7 or directly to valve 12. Additionally, the bi-stable hydraulic actuator 10 incorporates a first hydraulic line 18 and a second hydraulic line 16. In turn the first hydraulic line 18 is attached to a first solenoid-controlled valve 22 while hydraulic line 16 is attached to a second solenoid-controlled valve 24. The first solenoid-controlled valve 22 is in turn connected to hydraulic line 36 where hydraulic line 36 is attached to hydraulic reservoir 40. The second solenoid control valve 24 is in turn connected to hydraulic line 38 where hydraulic line 38 is attached to hydraulic reservoir 40. The first solenoid control valve 22 is attached to processor 28 via cable 26 while the second solenoid control valve 24 is attached to processor 28 via cable 20. The processor 28 is in turn attached to input device 30 by cable 32. In certain instances, input device 30 may be directly attached to processor 28 or may be connected via bluetooth or other radio protocols. In other instances, the processor may be connected to a remote input device via keycard or tablet 31 via wire or radio signal 33. The first solenoid control valve 22 and the second solenoid control valve 24 may be directly attached processor 28 or connected to processor 28 via bluetooth or other radio protocols.

In operation the lockout system 1 will have an initial condition where the system is off. In the off condition the first solenoid control valve 22 is closed so that hydraulic fluid is prevented from flowing between the first hydraulic line 18 and hydraulic line 36. Additionally, the second solenoid control valve 24 is closed so that once again hydraulic fluid is prevented from flowing between the second hydraulic line 16 and hydraulic line 38. In certain instances, the first solenoid control valve 22 or the second solenoid control valve 24 may be open while the other solenoid control valve is closed. With the solenoid control valves 22 and/or 24 closed hydraulic fluid is prevented from moving through the hydraulic circuit provided by first hydraulic chamber 42, piston 46, second hydraulic chamber 44, first hydraulic line 18, first solenoid control valve 22, hydraulic line 36, hydraulic reservoir 40, hydraulic control line 38, second solenoid control valve 24, and second hydraulic line 16. In the initial off condition, the piston 46 is generally towards either the first end 48 of the bi-stable hydraulic actuator 10 or towards the second end 50 of the bi-stable hydraulic actuator 10. With the piston 46 towards either the first end 48 or the second end 50 of the bi-stable hydraulic actuator 10, the ram 14 connected to piston 46 and to handle 7, the handle 7 is locked in place or otherwise prevented from moving between any of handle 7's positions by the hydraulic fluid lock caused when either the first solenoid control valve 22 or the second solenoid control valve 24 is closed. Handle 7 in turn controls valve 12.

In order to access the lockout system and appropriate code, such as an appropriately sequenced set of symbols, is entered into input device 30. Input device 30 may be one or more devices directly accessing processor 28. For instance, input device 30 may include a keypad, Internet access, hardwired remote location access i.e. a frac control van, or wireless access. It is envisioned that primary access will usually be through a key card 31 with an embedded RFID chip where the RFID chip includes the proper sequence of symbols. Symbols may be alphanumeric, hexadecimal, binary, or other symbols. Once the sequence of symbols is entered into the input device 30 the processor 28 receives those symbols and compares those symbols to a stored list. The processor 28 will then grant access to the lockout system 1 as is designated by the stored symbols. Generally, the access granted via the processor 28 will unlock the lockout system 1 and allow the user to manipulate the valves, such as valve 12, controlled by the lockout system 1 attached to the processor 28. In some instances, various levels of control may be granted. For instance, a lockout system 1 may control ten valves wherein a particular user may only be authorized manipulate a subset of those ten valves, for instance 5 of the 10 valves. In such a case the processor may only unlock a portion of the system, the 5 valves that the particular user is authorized to access. In certain instances, multiple lockout systems may be located on a particular well pad. An individual user may be granted access to a portion of a single system, a portion of multiple systems, full access to certain systems, partial access to others, or may be granted administrative privileges to add and delete users as needed on the various systems.

In those instances where the lockout system 1 is on, any of the authorized valves 12 may be manipulated. In the on condition the first solenoid control valve 22 is open so that hydraulic fluid is allowed to flow between the first hydraulic line 18 and hydraulic line 36. Additionally, the second solenoid control valve 24 is open so that once again hydraulic fluid is allowed to flow between the second hydraulic line 16 and hydraulic line 38. In this instance as either the first solenoid control valve 22 or the second solenoid control valve 24 may block the flow of fluid through the hydraulic circuit both the first solenoid control valve 22 and the second solenoid control valve 24 should be open. With the solenoid control valves 22 and 24 open hydraulic fluid is allowed to move through the hydraulic circuit provided by first hydraulic chamber 42, piston 46, second hydraulic chamber 44, first hydraulic line 18, first solenoid control valve 22, hydraulic line 36, hydraulic reservoir 40, hydraulic control line 38, second solenoid control valve 24, and second hydraulic line 16. In the on condition the piston 46 may be moved towards either the first end 48 of the bi-stable hydraulic actuator 10 or towards the second end 50 of the bi-stable hydraulic actuator 10 as handle 7 is manipulated between any of handle 7's position. Generally, as handle 7 is manipulated the attached ram 14 moves piston 46.

In the on condition, handle 7 may be manipulated to operate valve 12. As handle 7 is moved from an initial position to a second position the attached ram 14 moves from an initial position to a second position. Ram 14 is in turn connected to piston 46 where piston 46 may be towards either the first end 48 or the second end 50 of the hi-stable hydraulic actuator 10. As piston 46 moves between the first end 48 of the hi-stable hydraulic actuator 10 or towards the second end 50 of the hi-stable hydraulic actuator 10, fluid is forced out of one of the hydraulic chambers and drawn in to the other hydraulic chamber. For example, as piston 46 moves from the second end 50 of the bi-stable hydraulic actuator 10 towards the first end 48 of the bi-stable hydraulic actuator 10 the volume of the first hydraulic chamber 42 decreases. The hydraulic fluid within the first hydraulic chamber 42 is incompressible and therefore must be displaced. Therefore, the hydraulic fluid exits the first hydraulic chamber 42 and enters the hydraulic line 16. The hydraulic fluid then flows through the second solenoid control valve 24, provided that the second solenoid control valve 24 is open, and into reservoir 40.

As the piston 46 moves from the second end 50 of the hi-stable hydraulic actuator 10 towards the first end 48 of the bi-stable hydraulic actuator 10 the volume of the second hydraulic chamber 44 increases causing fluid from reservoir 40 to be drawn into hydraulic line 36 through the first solenoid control valve 22, provided that the first solenoid control valve 22 is open, into the hydraulic line 18, and finally into the second hydraulic chamber 44.

Figure 2:
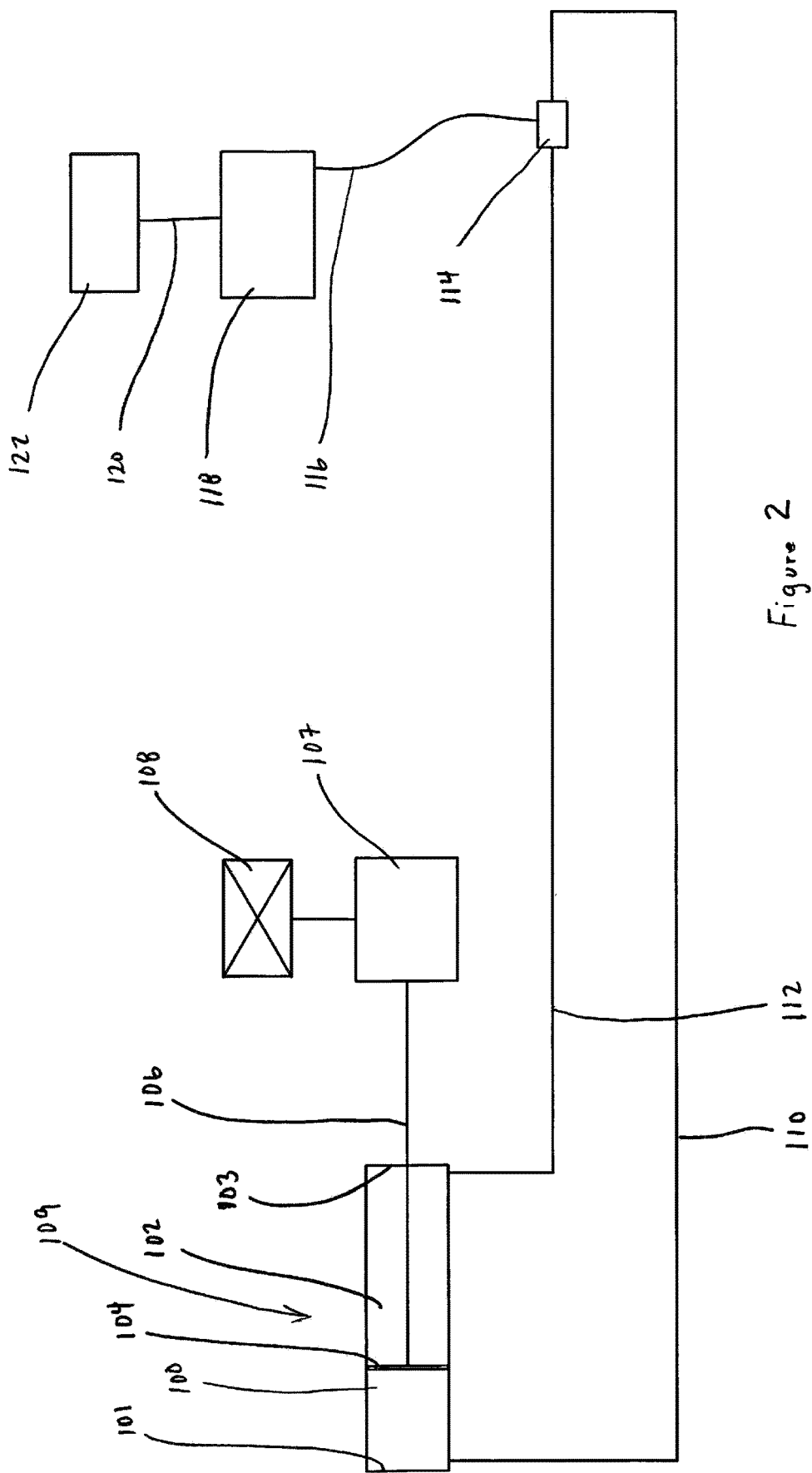
FIG. 2 depicts another embodiment having only a single solenoid valve.

FIG. 2 depicts another embodiment having only a single solenoid valve 114. In the off condition the single solenoid control valve 114 is closed so that hydraulic fluid is prevented from flowing between a hydraulic line 112 and a hydraulic line 110. With the solenoid control valve 114 closed hydraulic fluid is prevented from moving through the hydraulic circuit provided by first hydraulic chamber 100, piston 104, second hydraulic chamber 102, hydraulic line 112, solenoid control valve 114, and hydraulic line 110. In the initial off condition, the piston 104 is generally towards either the first end 101 of the hi-stable hydraulic actuator 109 or towards the second end 103 of the bi-stable hydraulic actuator 109. With the piston 104 towards either the first end 101 or the second end 103 of the hi-stable hydraulic actuator 10, a ram 106 connected to piston 104 and also connected to handle 107 is locked in place. Thereby locking the handle 107 in place or otherwise prevented from moving between any of handle 107's positions by the hydraulic fluid lock caused when the solenoid control valve 114 is closed. Handle 107 in turn controls valve 108.

In the on condition, handle 107 may be manipulated to operate valve 108. As handle 107 is now able to move from an initial position to a second position the attached ram 106 moves from an initial position to a second position. Ram 106 is in turn connected to piston 104 where piston 104 may be towards either the first end 101 or the second end 103 of the bi-stable hydraulic actuator 109. As piston 104 moves between the first end 101 of the hi-stable hydraulic actuator 109 or towards the second end 103 of the hi-stable hydraulic actuator 109, fluid is forced out of one of the hydraulic chambers and drawn in to the other hydraulic chamber. For example, as piston 104 moves from the second end 103 of the hi-stable hydraulic actuator 109 towards the first end 101 of the bi-stable hydraulic actuator 109 the volume of the first hydraulic chamber 100 decreases. The hydraulic fluid within the first hydraulic chamber 100 is incompressible and therefore must be displaced. Therefore, the hydraulic fluid exits the first hydraulic chamber 100 and enters the hydraulic line 110. The hydraulic fluid then flows through the solenoid control valve 114 and into hydraulic line 112. As piston 104 continues to move towards the first end 101 of the bi-stable hydraulic actuator fluid is both drawn into the second hydraulic chamber 102 as well as being forced into the chamber as fluid is displaced from the first hydraulic chamber 100.

In the alternative embodiment depicted in FIG. 3 a hydraulic motor 226 is connected to hydraulic line 213 and hydraulic line 210. In this embodiment an operator may connect to processor 218 using an input device 222 which may be connected to processor 218 by a hard wire 220, by radio via radio antenna 221, by the Internet, or any other means of connecting to the processor 218. Processor 218 is required to validate the user code of all potential users. Preferably on-site validation is accomplished by use of a card key with an embedded RFID chip or in an emergency by a provided emergency access code through input device 222. Once processor 218 is accessed, a command may be given via control line 224 to hydraulic motor 226 to move fluid into either hydraulic chamber 200 or hydraulic chamber 202 depending upon the required actuation of hydraulically operated valve 208. At the same time processor 218 will send a signal via control line 216 to open solenoid control valve 214. In some instances, it may be desirable to remove solenoid control valve 214 and rely solely upon hydraulic motor 226 to either move or lock fluid within hydraulic chambers 200 and 202. For example, it is envisioned that a frac site may be remotely monitored where a remote operator determines that a particular hydraulically operated valve such as valve 208 must be moved between a first position and a second position. The operator would then input the operator's code key to processor 218. Processor 218 then compares the code key to a previously provided list. Processor 218 then provides the designated level of access to the system. The operator then inputs the command into the processor 218 to move the hydraulically operated valve between a first position and the second position. The processor then sends the signal to open solenoid control valve 214, if provided. At the same time the processor 218 sends the signal to actuate the hydraulically operated pump 226 via control line 224. Pump 226 then activates to move fluid through hydraulic line 210 and then, for instance, into hydraulic chamber 200. As hydraulic fluid enters hydraulic chamber 200 piston 204 moves from a first end 201 to a second end 203 of bi-stable actuator 209. As piston 204 moves towards the second end 203 of hi-stable actuator 209 hydraulic fluid within hydraulic chamber 202 is forced into hydraulic line 212 through the presently open solenoid control valve 214 and to hydraulic motor 226. As piston 204 moves towards second and 203 of the bi-stable actuator 209 rain 206 moves handle 207 which in turn moves hydraulic actuator 208 between a first position and a second position. In certain instances, handle 207 may be omitted and ram 206 may directly actuate hydraulically actuated valve 208.

The lockout system in FIG. 5 utilizes a mechanical lock. In this embodiment the processor 304 may be accessed through a provided keypad 302 where a user may directly input an emergency code to gain access to the processor 304 or the user may be granted access via a key card incorporating RFID allowing the user to bypass the manual step of inputting his access code where the processor will read the access code directly off the RFID chip or similar device and immediately when the user is within range grant access to operate the hydraulically actuated valves from the keypad. In some instances, it is envisioned that the user may have an app on a smart phone, smart pad or similar device such that when the user is within range, of radio, Wi-Fi, or Bluetooth, and accesses the application on his personal device the user's code is sent to the processor via radio and antenna 301 wherein the processor 304 allows access as granted by the administrator. Once access is granted the user may manipulate the lockout system through the keypad 302 or by using his personal device. In certain instances, access to the processor may be from a remote location via radio, cellular communications, the Internet, or similar types of communications. Once the processor 304 is accessed the processor 304 will send a signal via control line 306 to actuator 308. In this instance actuator 308 is an electric solenoid. While an electrical solenoid is preferred a pneumatic solenoid may also be used. Where the electric solenoid 308 has a single stable bias position wherein the solenoid pin 310 is in the extended position. In the extended position solenoid pin 310 extends through a slot 312 formed in a portion of handle 314. With pin 300 extended through slot 312 handle 314 is prevented from moving. While it is envisioned that a solenoid pin extends through the handle any mechanical interference between solenoid 308 and handle 314 that prevents the handle 314 for moving may be utilized. For instance, pin 310 could be a cam that is rotated into or out of position while solenoid 308 could be a simple electric motor. Handle 314 is directly connected to valve 316 where valve 316 controls a hydraulically operated valve. While it is generally envisioned that a handle such as handle 314 is used to actuate the valve 316 in some instances it may be preferable to either dispense with a manually operable handle, in such cases the lockout system may directly interface with either the valve 316 or with the alternate operation system.

The methods and materials described as being used in a particular embodiment may be used in any other embodiment. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions; and improvements may fall within the scope of the inventive subject matter.

What is claimed is:

1. A valve lockout system comprising:
   a first valve having a first position and a second position,
   a hydraulic actuator having a first position and a second position,
      wherein the hydraulic actuator is mechanically linked to the first valve,
      further wherein changing the first valve between the first and second position requires moving the hydraulic actuator between the first position and the second position,
   a second valve having an open position and a closed position,
      wherein the hydraulic actuator and the second valve are linked by a hydraulic circuit,
      wherein the second valve in the open position allows the hydraulic actuator to move between the first position and the second position,
      wherein a force external to the hydraulic circuit causes the hydraulic actuator to move between the first position and the second position thereby moving a fluid in the hydraulic circuit,
      further wherein the second valve in the closed position prevents the hydraulic actuator from moving between the first position and the second position.

2. The valve lockout system of claim 1, wherein the second valve has a stable state wherein the valve is closed.

3. The valve lockout system of claim 2, further comprising a processor wherein the processor sends a signal to the second valve to move between the closed position to the open position.

4. The valve lockout system of claim 3, wherein the processor is accessed by providing a code.

5. The valve lockout system of claim 4, wherein the code is provided by wire.

* * * * *